June 15, 1971 P. SCHENK 3,584,350
ADJUSTABLE FASTENER ASSEMBLY
Filed June 10, 1969 6 Sheets-Sheet 1
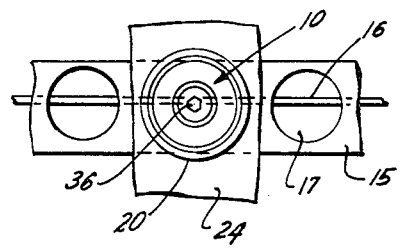
FIG.1
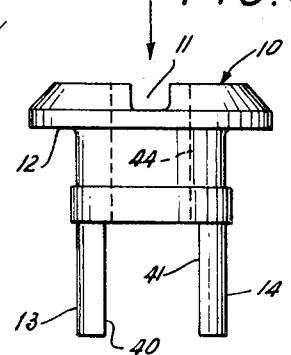
FIG.6
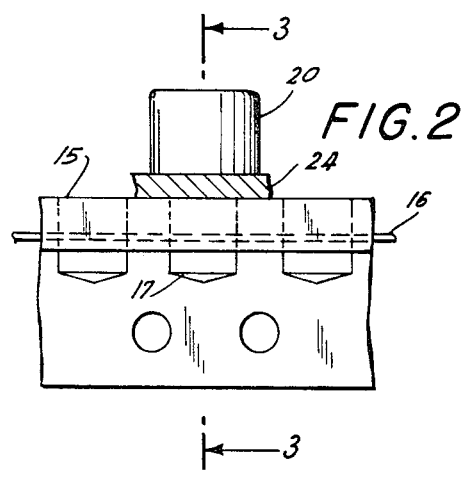
FIG.2
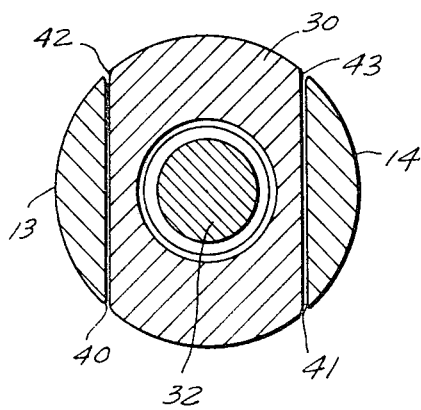
FIG.5
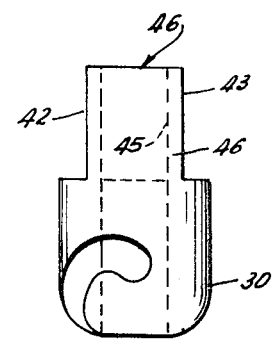
INVENTOR
PETER SCHENK
BY
Kane, Dalsimer, Kane, Sullivan & Smith
ATTORNEYS

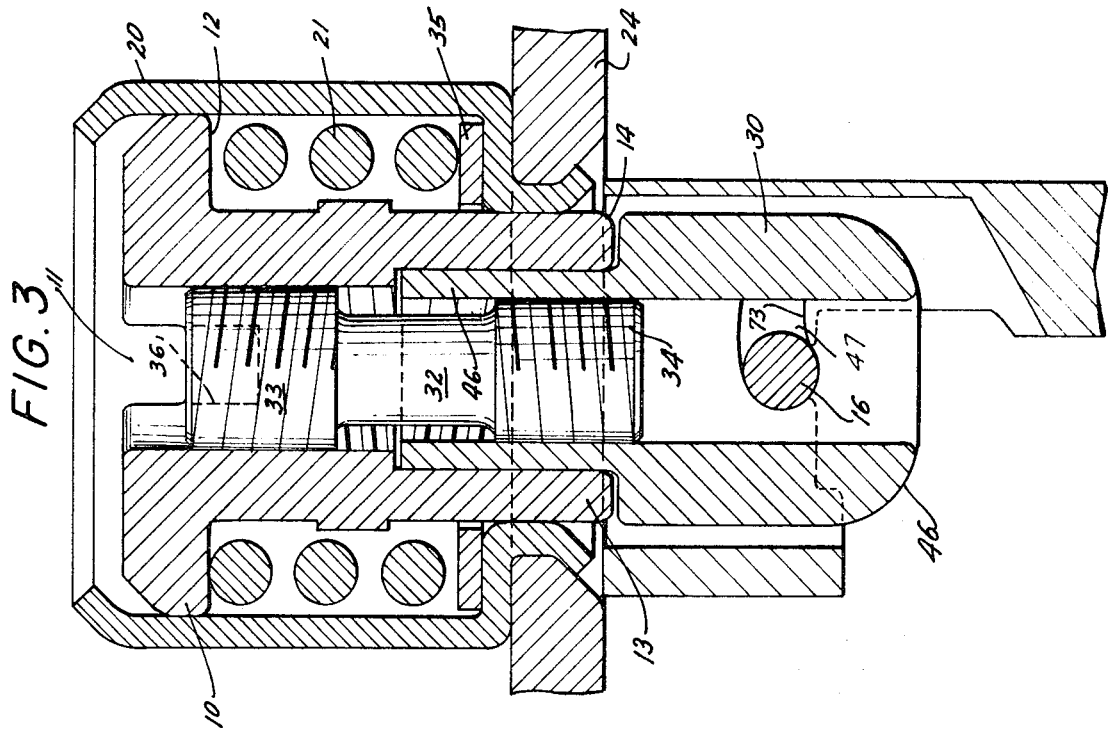
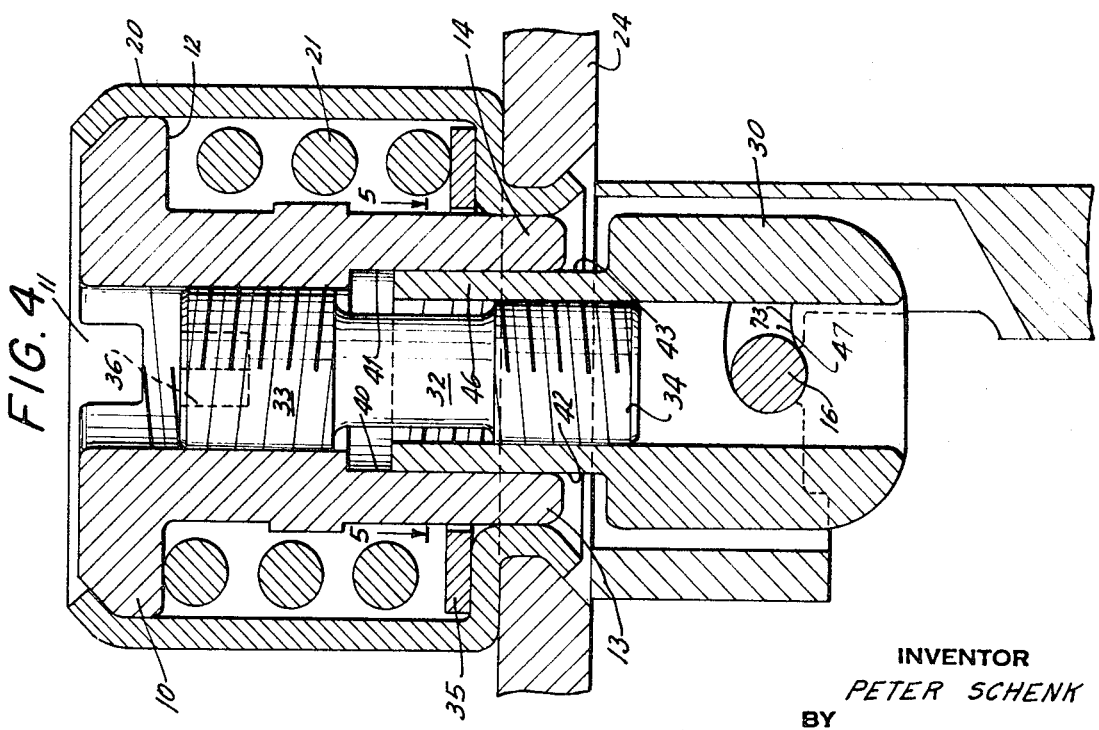

June 15, 1971  P. SCHENK  3,584,350
ADJUSTABLE FASTENER ASSEMBLY
Filed June 10, 1969  6 Sheets-Sheet 3

INVENTOR
PETER SCHENK
BY
Kane, Dalsimer, Kane, Sullivan & Smith
ATTORNEYS

June 15, 1971 P. SCHENK 3,584,350
ADJUSTABLE FASTENER ASSEMBLY
Filed June 10, 1969 6 Sheets-Sheet 4

INVENTOR
PETER SCHENK
BY
Kane, Dalsimer, Kane, Sullivan + Smith
ATTORNEYS

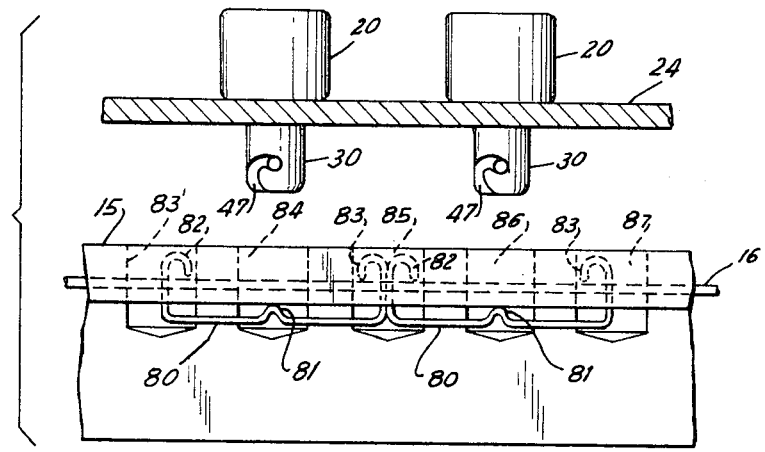

June 15, 1971 P. SCHENK 3,584,350
ADJUSTABLE FASTENER ASSEMBLY
Filed June 10, 1969 6 Sheets-Sheet 6
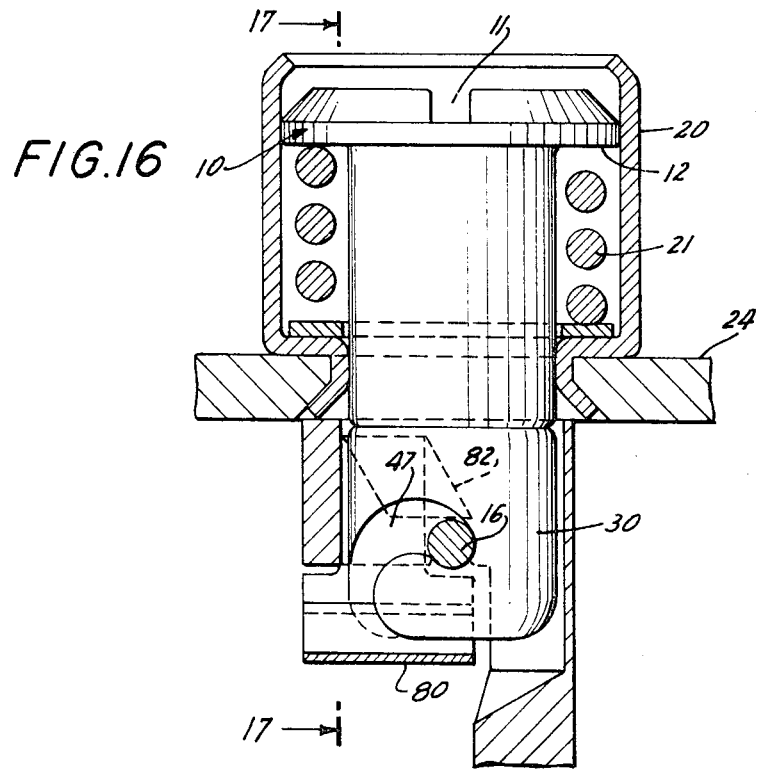
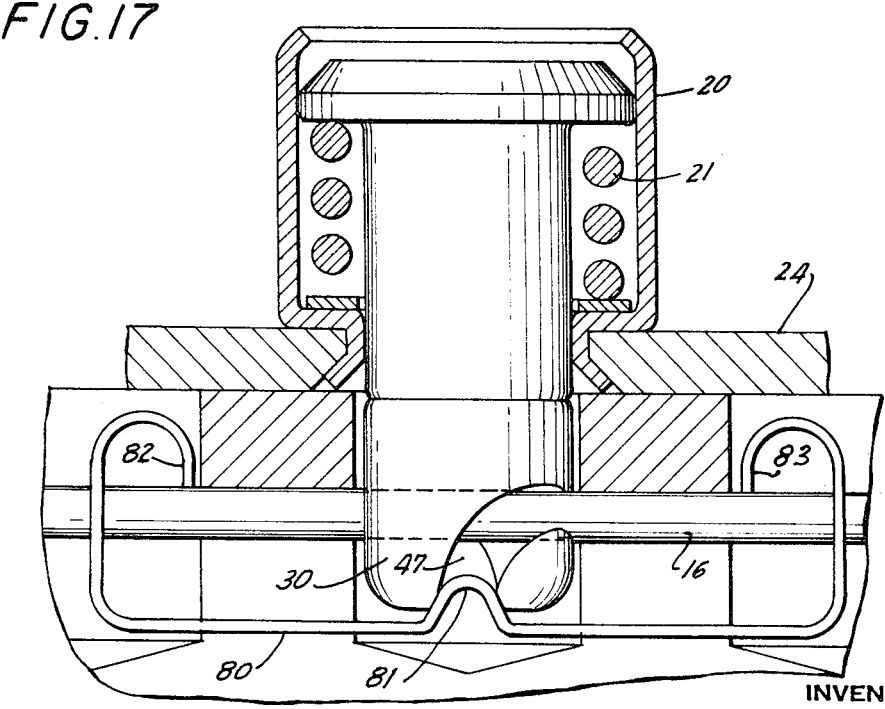
INVENTOR
PETER SCHENK
BY
ATTORNEYS United States Patent Office 3,584,350
Patented June 15, 1971

3,584,350
ADJUSTABLE FASTENER ASSEMBLY
Peter Schenk, West Islip, N.Y., assignor to Dzus Fastener
Co., Inc., West Islip, N.Y.
Filed June 10, 1969, Ser. No. 831,938
Int. Cl. A44b 17/00
U.S. Cl. 24—221K    20 Claims

ABSTRACT OF THE DISCLOSURE

A fastener element for joining separate members is provided with spiral cam slots for engaging a spring connecting to one of the members. When the fastener assembly is rotated, the spring is urged into the cam slots to fasten the spring and element together. A connecting member having reversely threaded sections joins a housing with the fastener element. When the connecting member is axially rotated the fastener element will ride on a threaded section of the connecting member to permit adjustment of the length of the fastener assembly. A resilient member can also be included in the assembly to prevent uncoupling of the assembly from the fastened members due to unintentional axial rotation.

BACKGROUND OF THE INVENTION

This invention relates to a fastener assembly and, more particularly, to an adjustable fastener assembly for detachably fastening separate members.

Fastener elements or devices such as those shown in Dzus U.S. Pat. No. 1,955,740 have been widely used for many years. These fastener elements are easily installed and result in a vibration-proof joint between the fastened members. Since it is frequently necessary to join separate members at varying distances from one another, it is necessary for the manufacturer to supply different size fastener elements having varying shank lengths to accommodate these distances.

BRIEF SUMMARY

A fastener assembly has now been developed which is adjustable and can be varied in length to accommodate the distance between the members to be fastened. The fastener assembly can also be provided with a resilient member to prevent uncoupling due to axial or lateral rotation of the fastener assembly.

An object of this invention is to provide a fastener assembly which can be adjusted as to length.

Another object of this invention is to provide a fastener assembly which can be provided with means to prevent accidental uncoupling from the members to be joined due to lateral rotation.

A further object of this invention is to provide a fastener assembly which is readily adaptable for use on panels and other applications.

Other objects and advantages will become apparent from the following description taken in conjunction with the accompanying drawings in which:

FIG. 1 is a top plan view of the fastener assembly mounted on a panel;

FIG. 2 is a side elevation view partly in section showing a panel-mounted fastener assembly;

FIG. 3 is a detailed vertical, sectional view taken along the line 3—3 of FIG. 2;

FIG. 4 is a vertical, sectional view similar to FIG. 3 showing the fastener element in the extended position to provide a longer fastener assembly;

FIG. 5 is a horizontal, sectional view taken along the line 5—5 of FIG. 4;

FIG. 6 is an exploded side elevation view of the fastener assembly components;

FIG. 13 is a side elevation view of a pair of fastener assemblies uncoupled from the panel;

FIG. 14 is a side elevation view of the fastener assemblies mounted on the panel;

FIG. 15 is a bottom plan view of the fastener assemblies mounted on the panel;

FIG. 16 is a vertical sectional view of the fastener assembly mounted on the panel and taken along the line 16—16 of FIG. 14; and FIG. 17 is a vertical sectional view of the fastener assembly mounted on the panel and taken along the line 17—17 of FIG. 16.

DESCRIPTION OF THE INVENTION

Figures 7, 8:
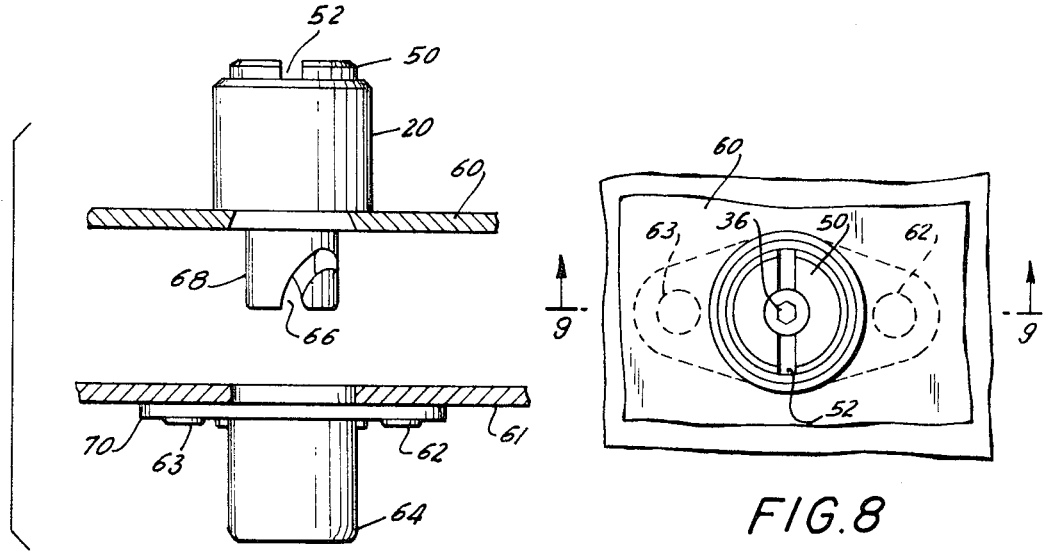
FIG. 7 is an exploded side elevation view of the members to be fastened and the fastener assembly in separated or disassembled relationship in an alternative embodiment.
FIG. 8 is a top plan view of the fastener assembly in position.

In accordance with this invention the fastener assembly for detachably fastening together separate members includes a spring attached to the first of these members. A housing is provided which has a threaded section positioned internally. Also included is a fastener element movably positioned in the housing and having an internally threaded section reverse to that of the housing threaded section. By the use of the term "reversely threaded sections" it is meant that one section is a left-hand thread while the other section is a right-hand thread. The fastener element is also provided with a shank extending downwardly and having a spiral cam slot disposed in the shank wall to permit engagement of the spring in the slot so that when the shank is axially rotated the spring is urged into the cam slot to fasten the shank and spring together. Means are provided for engaging and holding the second member in the fastened position. Also included is a member for connecting the housing and fastener element which is provided with a pair of reversely threaded sections for engaging the correspondingly threaded sections of the housing and fastener element. Means are included for preventing the fastener element from rotating during installation when the connecting member is axially rotated. Consequently when the connecting member is axially rotated the fastener element will move relative to the housing and allow adjustment of the length of the fastener assembly. To further prevent axial rotation of the fastener assembly after engagement with the members to be joined, a resilient member can be included in the assembly.

PREFERRED EMBODIMENTS

Referring now to the drawings, FIG. 6 represents the basic invention embodied in the fastener assembly. Housing 10 is provided with kerf 11, shoulder 12 and threaded section 44 positioned internally. Shoulder 12 will engage and hold one of the members in the fastened position. Extending downwardly are sections 13 and 14 which are provided with internally flat surfaces 40 and 41. Fastener element 46 has an internally threaded section 45 whose threads are reverse to that of threaded section 44 of housing 10. Threaded section 45 of fastener element 46 is reverse to that of threaded section 44 of housing 10 since threaded section 44 is a left-hand thread while threaded section 45 is a right-hand thread. It will be obvious of course to one skilled in the art that threaded section 45 could be a left-hand thread while threaded section 44 could be a right-hand thread. The important feature is that threaded sections 44 and 45 are reverse to one another to allow fastener element 46 to advance or retract, depending on the direction of axial rotation of connecting member 32, and thus alter the length of the fastener assembly.

Member 32 connects housing 10 with fastener element 46 and is provided with a pair of reversely threaded sections 33 and 34. Threaded section 33 engages mating threaded section 44 of housing 10 while threaded section 34 engages mating threaded section 45 of fastener element 46. Fastener element faces 42 and 43 are flat and, when inserted within housing 10 and in engagement with surfaces 40 and 41, will prevent fastener element 46 from rotating when connecting member 32 is rotated axially. Hexagonal shaped key recess 36 in connecting member 32 is designed to accommodate a tool, such, for example, as an Allen wrench, screwdriver slot or cross slot, etc., to cause axial rotation of connecting member 32. Since threaded section 33 is a left-hand thread while threaded section 34 is a right-hand thread, when connecting member 32 is axially rotated counterclockwise (looking downward in the direction of the arrow shown in FIG. 6) fastener element 46 will ride downwardly on threaded section 34 of connecting member 32 to lengthen the fastener assembly.

FIG. 3 is a sectional view through the fastener assembly showing connecting member 32 mounted by means of threaded section 33 in housing 10. FIG. 3 discloses fastener element 46 in the fully retracted position. FIG. 4 is a similar sectional view to that of FIG. 3 showing fastener element 46 advanced downwardly from housing 10 to lengthen the fastener assembly. As shown in FIGS. 3, 4 and 5, when surfaces 42 and 43 of fastener element 46 engage internal surfaces 40 and 41, respectively, of housing 10, fastener element 46 will not rotate when connecting member 32 is axially rotated.

FIGS. 3 and 4 also show shank 30 of fastener element 46 engaging spring 16 and holding the member to which spring 16 is connected (not shown) in fastened relationship with member 24. Resilient member or spring 21 is carried by housing 10 and is provided with sleeve 20 for enclosing the spring and housing. As there shown, sleeve 20 acts as an extension of shoulder 12 and serves as a means for engaging and holding member 24 in fastened relationship with spring 16. Shoulder 12 will also function in the absence of sleeve 20 as a means for engaging and holding member 24 in the fastened relationship with spring 16. Resilient member 21 is in compressive engagement with housing 10 and, through spring tension directed upwardly on housing 10, acts to lock spring 16 in cam slot 47 to prevent accidental disengagement or uncoupling of the fastener assembly. In addition, resilient member 21, through compression, permits some variation in fastener length. The fastener assembly is uncoupled from spring 16 and member 24 by depressing housing 10 downwardly with a screwdriver or other tool inserted in kerf 11 and then rotating the assembly counterclockwise to disengage spring 16 from spiral cam slot 47 disposed in the shank wall of fastener element 46.

FIGS. 1 and 2 show the fastener assembly mounted on a panel through aperture 17. In this connection, spring 16 is fastened to, and extends longitudinally along, panel 15. By including resilient member 21 in the fastener assembly to urge housing 10 upwardly and prevent lateral rotation of the fastener assembly, and to allow additional vertical adjustment, the fastener assembly is adaptable for use as a panel fastener.

FIGS. 7 to 10 show another embodiment of fastener assembly 80 in accordance with this invention. Housing 50 is provided with kerf 52, shoulder 85 and threaded section 51 positioned internally. Sleeve 20 is positioned about housing 50 and acts as an extension of shoulder 85 and functions as a means for engaging and holding member 60 in the fastened position. If sleeve 20 is not included in the assembly, shoulder 85 can function as a means for engaging and holding member 60 in the fastened position. Fastener element 75 is movably positioned in housing 50 and has a downwardly extending shank 68. Connecting member 32 joins housing 50 with fastener element 75 by means of reversely threaded sections 33 and 34. Internal thread 51 of housing 50 is the reverse of internal thread 69 of fastener element 75 so that as connecting member 32 is axially rotated, fastener element 75 will ride on threaded section 34 and move relative to housing 50 to adjust the length of the fastener assembly.

Internal surfaces 81 and 83 of housing 50 are flat and designed to engage flat surfaces 82 and 84, respectively, of fastener element 75 to prevent the fastener element from rotating along with connecting member 32 during axial rotation of the connecting member.

Figure 9:
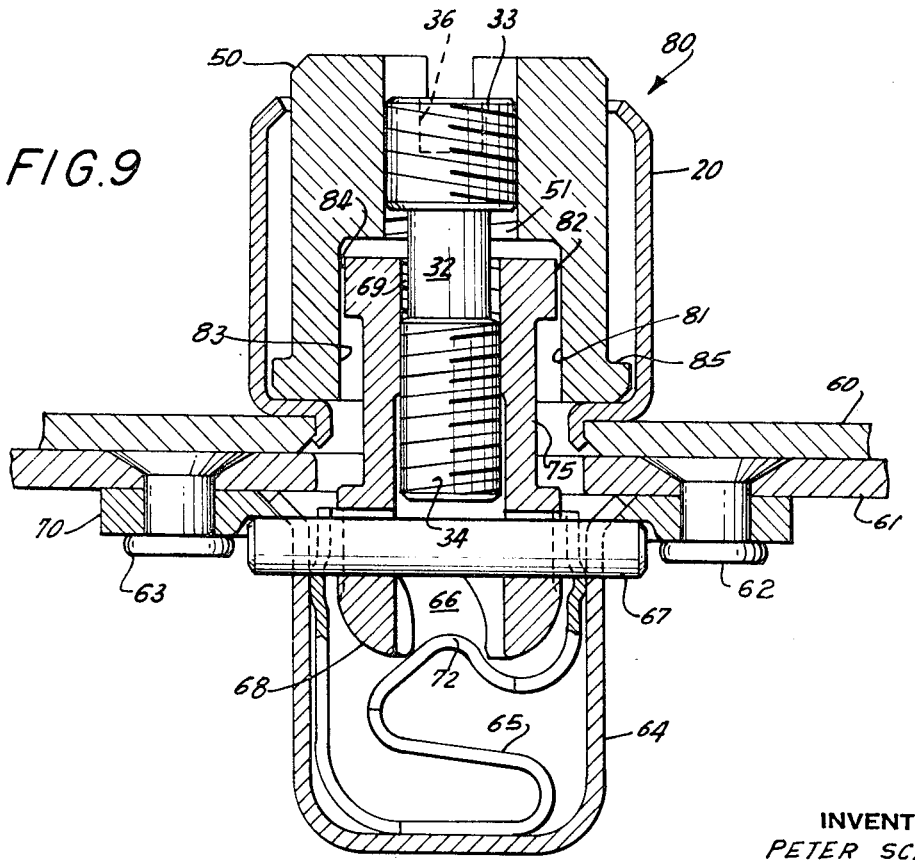
FIG. 9 is a vertical, sectional view taken along the line 9—9 of FIG. 8 showing the fastener assembly in the fully engaged position.

Receptacle 64 is positioned beneath member 61 and is connected thereto by means of plate 70 and screws 62 and 63. Cam rise 73 (as shown in FIGS. 3 and 4) is somewhat flat and not pronounced in order to facilitate positioning of spring 16 in slot 47. Because cam rise 73 is somewhat flat, certain operating conditions may cause the fastener assembly to accidentally uncouple from its mounted position. To prevent this resilient member 65 is positioned in receptacle 64 and, as can be seen from FIG. 9, is compressively engaged by shank 68 of fastener element 75 when the fastener assembly is in position. As thus compressed, detent 72 of resilient member 65 is positioned in cam slot 66 to serve as a locking means which prevents disengagement of shank 68 and spring 67 through axial rotation of the fastener assembly.

Figure 10:
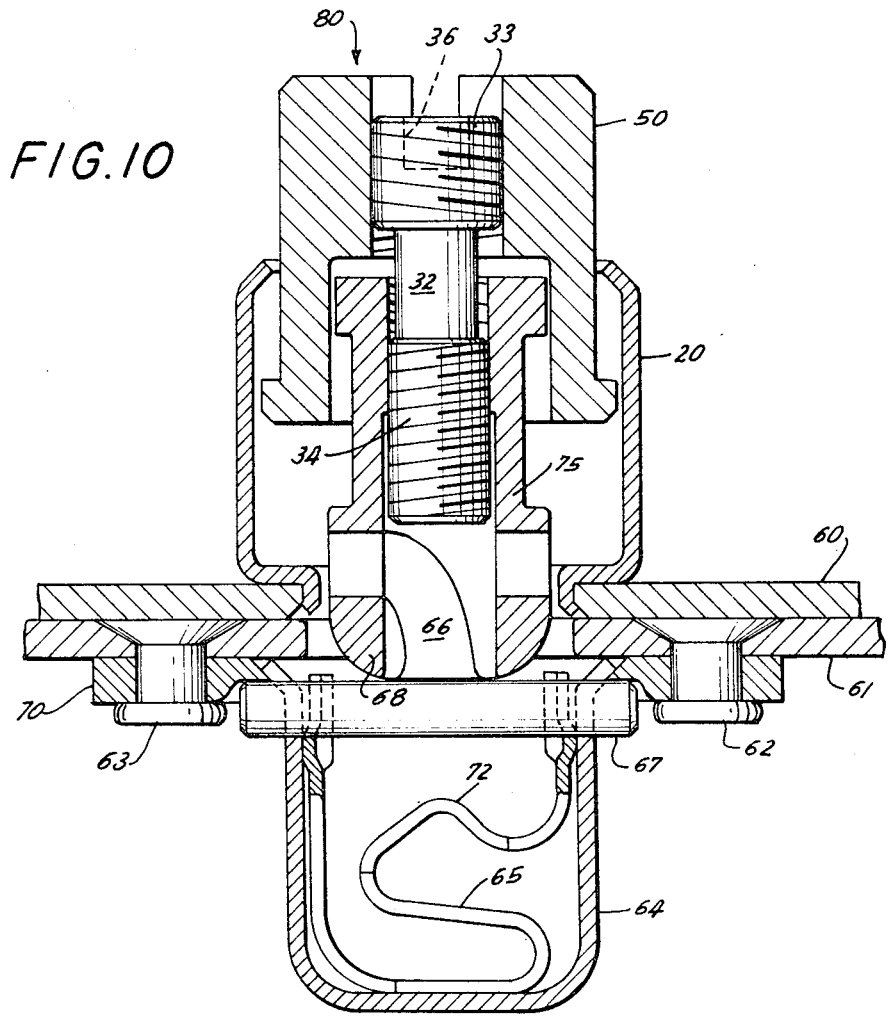
FIG. 10 is a vertical sectional view of the fastener assembly uncoupled from the members to be joined.
Figure 11:
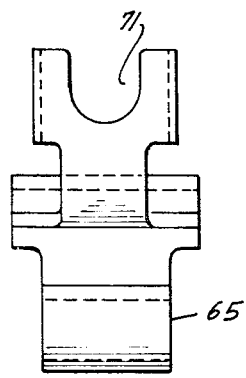
FIG. 11 is a side elevation view of a resilient member for preventing accidental disengagement of the fastener assembly.
Figure 12:
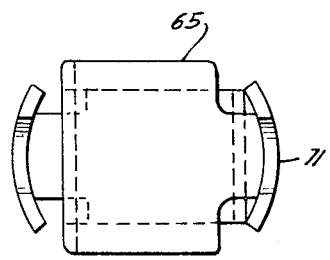
FIG. 12 is a top plan view of the resilient member shown in FIG. 11.

FIG. 10 shows shank 68 of fastener element 75 disengaged or uncoupled from spring 67. As can thus be seen, spring 67 connects to member 61 through receptacle 64 and plate 70. FIG. 11 shows a side elevation view of resilient member 65 removed from receptacle 64 and provided with cutout section 71 for engagement with the sidewalls of receptacle 64. FIG. 12 is a top plan view of resilient member 65 as shown in FIG. 11.

FIGS. 13 to 17 show the fastener assembly for mounting engagement with a panel. FIG. 13 illustrates a series of apertures 83', 85, 86 and 87 positioned in panel 15. Resilient member 80 having detent 81 engages spring 16 by means of hooks 82 and 83. As thus shown mounted in FIG. 13, each of the resilient members 80 are dimensioned so that detent 81 is centered in an aperture such as apertures 84 and 86. When the fastener assembly is mounted on the panel, as shown in FIG. 14, detent 81 extends into cam slot 47 to prevent axial rotation of the fastener assembly. FIG. 16 shows hook 82 in engagement with wire 16 to position resilient member 80 on the panel.

The fastener assembly embodied in FIGS. 1, 2, 6 and 13 to 17 is useful in mounting numerous instrument panels in aircraft. The fastener assembly embodied in FIGS. 7 to 10 is useful for joining or mounting a relatively small number of individual members.

Although the present invention has been described in conjunction with preferred embodiments, it is to be understood that modifications and variations may be resorted to without departing from the spirit and scope of the invention as those skilled in the art will readily understand.

What is claimed is:

1. An adjustable fastener assembly for detachably fastening together separate members which comprises:

a spring connecting to the first of said members;

a housing having a threaded section positioned internally;

a fastener element movably positioned in the housing and having an internally threaded section the reverse of that of the housing threaded section, said fastener element being further provided with a shank extending downwardly therefrom and having a spiral cam slot disposed in the shank wall to permit engagement of the spring in the slot so that when the shank is axially rotated the spring is urged into the cam slot to fasten the shank and spring together;

means for engaging and holding the second of said members in the fastened position;

a member connecting the housing and fastener element, said member having reversely threaded sections for engaging the correspondingly threaded sections of the housing and fastener element; and means for preventing the fastener element from rotating during axial rotation of the connecting member so that when the connecting member is axially rotated the fastener element will move relative to the housing and allow adjustment of the length of the fastener assembly.

2. A fastener assembly in accordance with claim 1 wherein the interanlly threaded section of the housing comprises a right-hand thread and the threaded section of the fastener element comprises a left-hand thread.

3. A fastener assembly in accordance with claim 2 wherein the threaded sections of the connecting member comprise a right-hand thread for mating engagement of the threaded section of the housing and a left-hand thread for mating engagement of the threaded section of the fastener element.

4. A fastener assembly in accordance with claim 1 wherein the internally threaded section of the housing comprises a left-hand thread and the threaded section of the fastener element comprises a right-hand thread.

5. A fastener assembly in accordance with claim 4 wherein the threaded sections of the connecting member comprise a left-hand thread for mating engagement of the threaded section of the housing and a right-hand thread for mating engagement of the threaded section of the fastener element.

6. A fastener assembly in accordance with claim 5 including resilient means carried by the housing and in compressive engagement therewith for maintaining the fastener element and spring in engagement by preventing accidental disengagement of the fastener assembly by axial rotation.

7. A fastener assembly in accordance with claim 6 wherein the means for engaging and holding the second member comprise a sleeve positioned about the resilient means and housing so that the housing is vertically movable in the sleeve.

8. A fastener assembly in accordance with claim 7 wherein the housing is provided with a shoulder which extends over the resilient means and is in engagement therewith.

9. A fastener assembly in accordance with claim 1 including a resilient member positioned beneath the shank and in engagement therewith to prevent axial rotation of the fastener assembly.

10. A fastener assembly in accordance with claim 9 wherein the resilient member includes a detent extending into the slot to prevent axial rotation of the fastener assembly.

11. A fastener assembly in accordance with claim 1 including:

a receptacle positioned beneath the second member and connecting the spring thereto; and a resilient member positioned in the receptacle in compressive engagement with the shank for preventing axial rotation of the fastener assembly.

12. A fastener assembly in accordance with claim 11 wherein the resilient member includes a detent extending into the cam slot to prevent axial rotation of the fastener assembly.

13. An adjustable fastener assembly for detachably fastening together separate members which comprises:

a receptacle attached to the first of said members;

a spring carried by the receptacle;

a housing having a threaded section positioned internally;

a fastener element movably positioned in the housing and having an internally threaded section the reverse of that of the housing threaded section, said fastener element being further provided with a shank extending downwardly therefrom and having a spiral cam slot disposed in the shank wall to permit engagement of the spring in the slot so that when the shank is axially rotated the spring is urged into the cam slot to fasten the shank and spring together;

means for engaging and holding the second of said members in the fastened position;

threaded means connecting the housing and fastener element which, when axially rotated, will vertically move the fastener element with respect to the housing to permit adjustment of the length of the fastener assembly;

means for preventing the fastener element from rotating during axial rotation of the threaded connecting means; and a resilient member positioned in the receptacle in compressive engagement with the shank to prevent axial rotation of the fastener assembly.

14. A fastener assembly in accordance with claim 13 wherein the resilient member includes a detent extending into the cam slot to prevent axial rotation of the fastener assembly.

15. A fastener assembly in accordance with claim 13 wherein the threaded means comprises a connecting member having reversely threaded sections for engaging the correspondingly threaded sections of the housing and fastener element.

16. A fastener assembly in accordance with claim 15 wherein the means for engaging and holding the second member comprise a sleeve positioned about the housing so that the housing is vertically movable in the sleeve.

17. A fastener assembly in accordance with claim 15 wherein the internally threaded section of the housing comprises a left-hand thread and the threaded section of the fastener element comprises a right-hand thread.

18. A fastener assembly in accordance with claim 17 wherein the threaded sections of the connecting member comprise a left-hand thread for mating engagement of the threaded section of the housing and a right-hand thread for mating engagement of the threaded section of the fastener element.

19. A fastener assembly in accordance with claim 15 wherein the internally threaded section of the housing comprises a right-hand thread and the threaded section of the fastener element comprises a left-hand thread.

20. A fastener assembly in accordance with claim 19 wherein the threaded sections of the connecting member comprise a right-hand thread for mating engagement of the threaded section of the housing and a left-hand thread for mating engagement of the fastener element.

References Cited

UNITED STATES PATENTS

| 2,385,180 | 9/1945 | Allen | 24—221K |
|---|---|---|---|
| 2,552,779 | 5/1951 | Griffin | 24—221A |
| 2,839,808 | 6/1958 | Zahodiakin | 24—221K |

GEORGE F. MAUTZ, Primary Examiner